June 14, 1949.　　　　N. LUNDSTROM　　　　2,472,909
FIRELESS BROODER
Filed March 23, 1945

INVENTOR.
Nels Lundstrom:
BY
Victor J. Evans & Co.
ATTORNEYS

Patented June 14, 1949

2,472,909

UNITED STATES PATENT OFFICE 2,472,909

FIRELESS BROODER

Nels Lundstrom, Almont, N. Dak.

Application March 23, 1945, Serial No. 584,305

3 Claims. (Cl. 119—33)

This invention relates to fireless brooders and includes among its objects and advantages the provision of an extremely simple and inexpensive, but highly efficient, brooder construction, and an improved protective covering adjustable within the brooder body to accommodate growth of the chicks.

Figure 1:
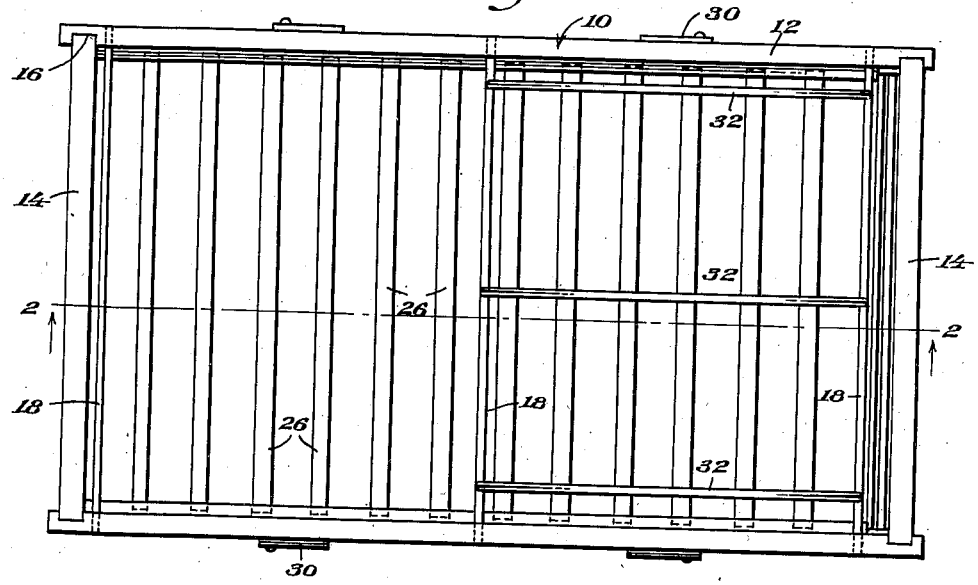
Figure 1 is a top plan view of my invention.

In the embodiment of the invention selected for illustration, I make use of an enclosure 10, substantially rectangular in form, made up of side walls 12 and end walls or gates 14. Grooves 16 are formed in the inner faces of the side walls 12 to receive the ends of the gates 14, and the side walls are fixedly secured together by tie rods 18. Secured on each side wall 12 are several longitudinally extending bars 20 spaced apart to provide grooves or tracks 22. A protective covering or web 24 is secured on the under sides of a series of cross slats 26, the ends of which are receivable in the tracks 22. This protective covering may comprise fur material preferably in sheet form, with the hair side down. The several tracks 22 curve upwardly at their ends to facilitate the removal of the cover unit, or its partial removal, for access to the lower portion of the enclosure. Ventilating openings 28 are provided in the side walls 12 which openings are controlled by dampers 30 pivoted on the side walls.

Figure 2:
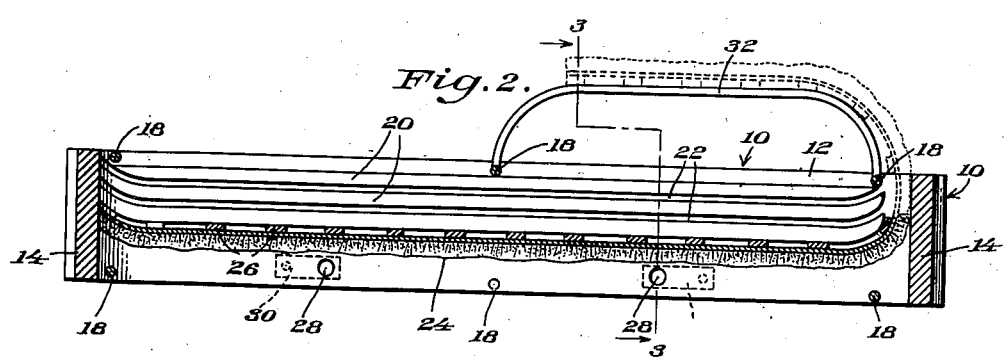
Figure 2 is a sectional view along the line 2—2 of Figure 1.
Figure 3:
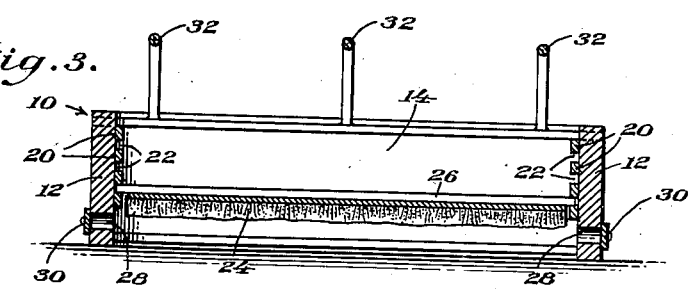
Figure 3 is a sectional view along the line 3—3 of Figure 2.

Upwardly bowed rods 32 are mounted on two of the upper of the tie rods 18 to constitute a support for the protective covering 24 when it is pulled to the dotted line position of Figure 2.

The grooves 22 provide means whereby the protective covering may be moved to different vertical positions, depending upon the size of the chicks. The enclosure may rest on the ground and the protective covering is arranged sufficiently close to the floor or ground to afford the necessary warmth for the chicks.

Without further elaboration, the foregoing will so fully explain my invention, that others may, by applying current knowledge, readily adapt the same for use under various conditions of service.

I claim:

1. In a brooder of the fireless type, the combination which comprises a relatively shallow rectangular shaped frame having spaced side walls with vertically disposed gate receiving grooves in the inner surfaces and spaced from the ends thereof, ventilating openings spaced from the lower edges, and spaced parallel horizontally positioned longitudinally extended bars providing tracks on the inner surfaces, said bars having arcuate upwardly extended ends whereby the tracks extend upwardly at the ends, gates slidably mounted in the grooves in the ends of the side walls, transversely disposed rods extended through the said side walls maintaining the walls in upright position, a plurality of spaced slots extended across the frame with the end thereof positioned to travel in the tracks between the bars, a web providing a protecting covering carried by the slats and extended continuously across the frame and from end to end thereof to substantially seal the lower part of the frame, and upwardly bowed rods positioned above the frame and carried thereby, said rods positioned with the ends thereof at one end of the frame spaced from the gate at that end of the frame and positioned to coact with the ends of the tracks to receive the said web and temporarily support the web above the frame.

2. A brooder as described in claim 1 having dampers on the side walls positioned to cover the ventilating openings in the lower edges of the walls to control the areas of said openings.

3. A brooder as described in claim 1 wherein the lower surface of the web is covered with fur.

NELS LUNDSTROM.

REFERENCES CITED

The following references are of record in the file of this patent:

UNITED STATES PATENTS

| Number | Name | Date |
|---|---|---|
| 520,526 | Homer | May 29, 1894 |
| 886,926 | Bishopric | May 5, 1908 |
| 918,174 | Lee | Apr. 13, 1909 |
| 971,832 | Jones et al. | Sept. 20, 1910 |
| 1,264,002 | Blalock | Apr. 23, 1918 |
| 1,438,455 | Moll | Dec. 12, 1922 |
| 1,955,835 | Samstag | Apr. 24, 1934 |
| 2,397,415 | Ghez et al. | Mar. 26, 1946 |

FOREIGN PATENTS

| Number | Country | Date |
|---|---|---|
| 722,504 | France | Dec. 29, 1931 |